Nov. 24, 1953          G. E. PARKER          2,660,422
           VIBRATION DAMPING MEANS FOR GOVERNOR
                    Filed July 20, 1950
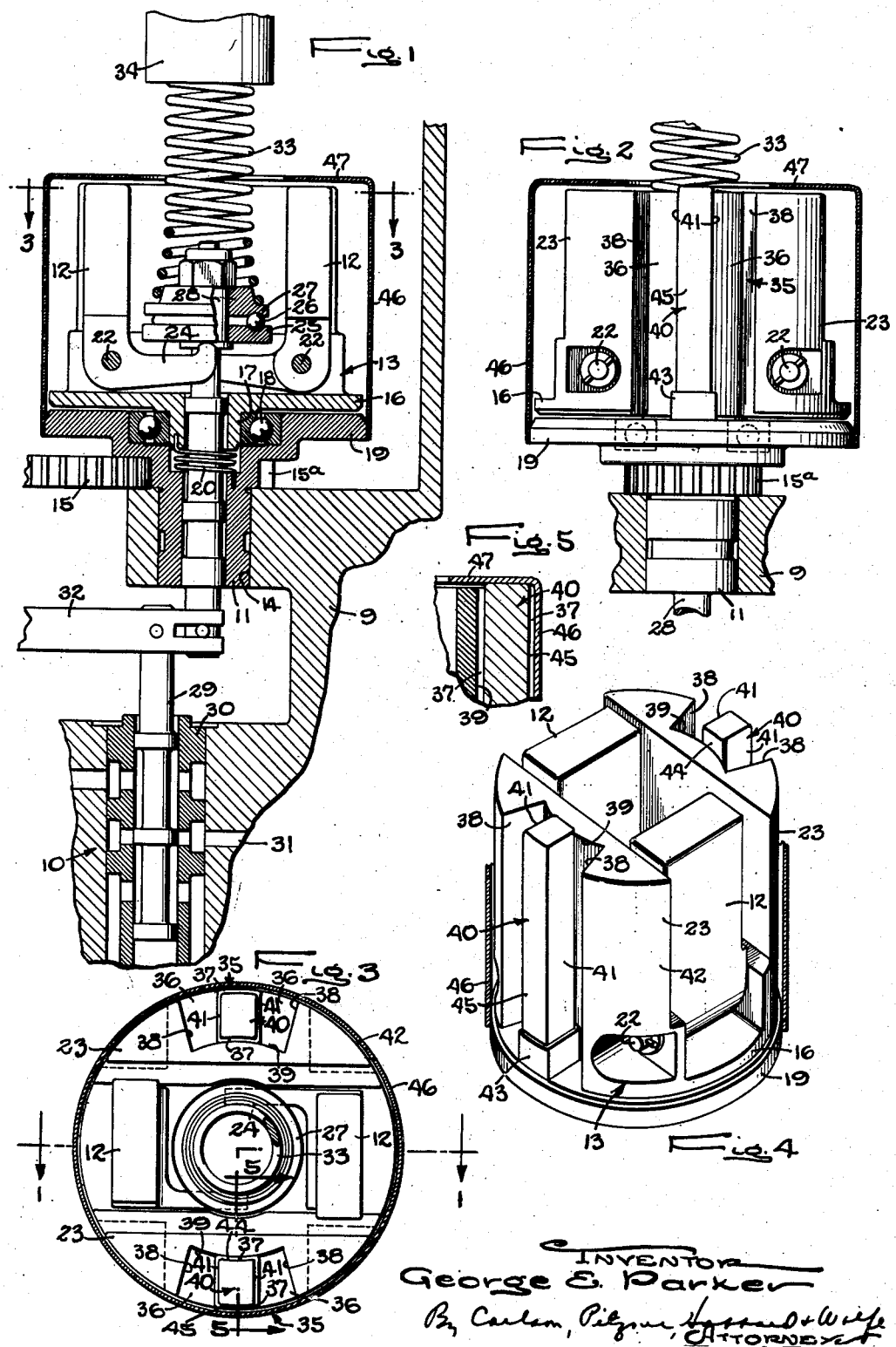
INVENTOR
George E. Parker
By Carlson, Pitzner, Hubbard + Wolfe
ATTORNEYS Patented Nov. 24, 1953

2,660,422

UNITED STATES PATENT OFFICE 2,660,422

VIBRATION DAMPING MEANS FOR GOVERNOR

George E. Parker, Rockford, Ill., assignor to Woodward Governor Company, Rockford, Ill., a corporation of Illinois Application July 20, 1950, Serial No. 174,860

9 Claims. (Cl. 264—2)

This invention relates to devices operable by centrifugal action to sense changes in the speed of a rotary member.

The primary object is to associate with such a speed sensing device a novel fluid displacement means operable with a damping action to minimize the detrimental effect of false oscillations in the mechanical drive connection by which the centrifugal device is driven.

Another object is to achieve the damping effect by the action of a dashpot having coacting fluid displacement elements angularly movable relative to each other in response to the false oscillations of the member whose speed changes are to be sensed.

The invention also resides in the novel construction and arrangement of the dashpot elements in relation to speed sensing flyweights.

Other objects and advantages of the invention will become apparent from the following detailed description taken in connection with the accompanying drawing, in which:

Figure 1 is a fragmentary sectional view taken along the line 1—1 of Fig. 3 of a speed responsive valve embodying the novel features of the present invention.

Fig. 2 is a side view with certain of the parts broken away.

Fig. 3 is a section taken along the line 3—3 of Fig. 1.

Fig. 4 is a fragmentary perspective view of the speed sensing and dashpot elements.

Fig. 5 is a fragmentary section taken along the line 5—5 of Fig. 3.

In the embodiment shown in the drawing for purposes of illustration, the control device is a valve 10 for controlling the flow of pressure fluid with changes in the speed of a rotary member 11 detected by the action of flyweights 12 mounted on a ball head 13 which rotates with the driving member. Herein, the latter comprises a sleeve journaled in a bore 14 of the valve casing 9 and driven from a prime mover or other part whose speed is to be measured. The drive connection may terminate in a gear 15 meshing with spur teeth 15ᵃ formed around the sleeve above its bearing 14. The ball head 13 comprises a disk 16 having a depending center flange 17 journaled in an antifriction bearing 18 whose outer race ring is pressed into a counterbore in an annular flange 19 formed on the upper end of the drive sleeve 11.

For a purpose to appear later, the ball head is driven from the sleeve 11 through a torque transmitting connection which is angularly yieldable so as to permit some degree of angular displacement of the ball head relative to the drive sleeve in response to instantaneous variations in the speed of the sleeve. Herein, this resilient coupling is formed by a torsion spring 20 of several turns coiled around the ball head axis and having one end anchored in the lower end of the ball head flange 17 and the other end secured to the drive sleeve.

The flyweights 12 are disposed on diametrically opposite sides of the ball head and are pivoted at their lower ends on pins 22 spanning a diametrical slot between projections 23 of segmental cross section rigid with and upstanding from the ball head disk 16. Arms 24 projecting inwardly from the lower ends of the flyweights bear upwardly against the lower race 25 of a ball bearing 26 whose upper race 27 supports a rod 28 slidable endwise through the flange 17 and the drive sleeve and connected at its lower end to the movable element of the valve 10. Herein, the valve element is a plunger 29 having lands therein cooperating with ports in a sleeve 30 to control the flow of pressure fluid into or out of a passage 31 leading to a servo or other device (not shown) whose energization is to be controlled by the valve action in accordance with changes in the speed of the drive shaft. The valve plunger may be formed directly on the rod 28 or, as here, connected to the latter through the intermediary of a lever 32.

A spring 33 acts in compression against the upper bearing ring 27 and urges the valve rod downwardly until the centrifugal force acting on the flyballs is balanced. The upper end of the spring bears against an abutment 34 which may be adjusted axially to vary the speed setting of the valve or in other words the speed of the drive sleeve at which the valve 10 is opened.

When the sleeve 14 is driven from a prime mover or other source through shafts, gearing, couplings, etc., it usually does not turn smoothly but is forced to oscillate intermittently or continuously due to transient conditions, play, and inaccuracies in the driving connections, explosive pulsations, etc. As a result of such forced oscillation, the instantaneous speed of the sleeve departs from the average speed of the prime mover, the amplitude of the transmitted oscillations frequently exceeding the band of insensitivity of the control valve 10 particularly when the frequency of the forcing oscillations is near the natural frequency of the ball head system.

The present invention aims to minimize the detrimental effect of such forced oscillations by deriving a damping force by the action of one or more dashpots within which fluid is displaced at a restricted rate in response to relative angular displacement between the ball head and the drive sleeve 14. Two dashpots 35 are employed in the present instance and compactly arranged between the flyweights 12 on diametrically opposite sides of the ball head 13. Generally stated, each dashpot is formed by circumferentially spaced walls on the ball head and drive sleeve interfitting with each other to define angularly spaced fluid filled chambers 36 which are interconnected by one or more passages 37 through which fluid flows at a restricted rate in response to relative angular displacement between the ball head and drive sleeve in either direction.

Herein, the chambers 36 are defined in part by angularly spaced walls 38 on each ball head projection 23 lying substantially in radial planes and connected at their inner edges by an arcuate wall 39 concentric with the ball head axis and cooperating with the walls 38 to form an outwardly opening groove which extends downwardly through the ball head disk 16. Projecting upwardly through the groove from the drive flange 19 is a vane 40 whose opposite sides 41 are angularly spaced from the ball head walls 38. The vane is cast integral or otherwise made rigid with the flange 19 and extends a short distance above the upper flat end of the ball head projection 23 which has a segmental cross section and an outer arcuate surface 42 concentric with the ball head axis and disposed close to the outer periphery of the drive flange 19. Near its bottom, the vane 40 is enlarged as indicated at 43 to provide stops engageable with the ball head walls 38 to positively limit the permissible range of oscillation of the ball head, the total range being about 30 degrees in the present instance.

The inner edge 44 of the vane 40 cooperates with the arcuate bottom 39 of the ball head groove to form part of the restricting passage 37. Another part of the latter is formed by spacing the outer edge 45 of the vane inwardly from the internal surface of a cylinder 46 whose lower end is pressed down over the periphery of the flange 19 to form a cup for containing liquid such as oil to submerge the dashpots and thus maintain their chambers 36 filled at all times. An inturned flange 47 at the upper end of the cylinder 46 abuts against the upper ends of the vanes 40 and is spaced slightly above the ends of the projections 23 to provide the necessary running clearance. The flange overlies the upper ends of the ball head grooves thus closing the upper ends of the dashpot chambers except for the narrow spaces between the flange and the ends of the projections 23.

The valve casing 9 is extended to a height well above the cup flange 47 and adapted to contain light oil in which all of the rotating parts above described are submerged. The dashpot chambers 36 are thus kept filled with oil by gravitational flow in through the narrow spaces between the flange 47 and the upper ends of ball head projections 23.

When, in the operation of the speed sensing device, the drive sleeve 11 rotates at a precisely uniform velocity, the ball head 13 will be held by the spring 20 in a centered position relative to the sleeve, the vane 40 then being disposed midway between the walls 38 as shown in Fig. 3. Now, if impulses are forced upon the driving train tending to oscillate the latter, changes in the instantaneous velocity will be evidenced by turning of the ball head relative to the drive sleeve as permitted by angular yielding of the spring 20. Such angular displacement is resisted by the dashpots and is permitted at a rate determined by the restricted flow of fluid between the chambers 36 through the passages 37. Damping forces are thus exerted resisting turning of the ball head in either direction relative to the drive sleeve and, as a result, the amplitude of the ball head oscillation is kept relatively low near the speed of the drive shaft at which the forcing frequency approximates the natural frequency of the ball head system. When thus damped, the flyweights respond more nearly to the average speed of the drive shaft.

For many speed governor installations, it is desirable to employ a ball head system having a relatively low frequency. This is achieved by making the projections 23 of relatively large mass as shown and employing a low scale drive spring. Also, it may be desirable to vary the amount of the damping action in order to achieve optimum accuracy of response of the speed sensing device under various conditions. This may be accomplished easily by changing the effective area of the restricting passage 37 as by increasing or decreasing the spacing of the edges of the vanes 40 relative to the opposed surfaces of the ball head and the cylinder 46. In the use of the improved speed sensing device to govern the speed of internal combustion engines, satisfactory operation has been attained when the passages 37 are made about $\frac{3}{32}$ of an inch wide.

It will be apparent that the dashpot dampeners above described are of very simple and inexpensive construction and are arranged compactly within the ball head structure so that the overall dimensions of the latter are not increased appreciably. The dashpots are separated from the flyweights and other movable parts of the speed sensing device and do not interfere with or detract from the regular operation thereof.

I claim as my invention:

1. The combination of, a rotatable ball head having laterally spaced projections upstanding therefrom and having external arcuate surfaces concentric with the ball head axis, said projections having outwardly opening grooves extending longitudinally thereof, flyweights on said ball head swingable radially in the space between said projections, control means responsive to changes in the positions of said flyweights, a rotary driving member having a cylindrical wall closely surrounding said ball head surfaces and closing the outer edges of said grooves, inturned annular flanges at opposite ends of said wall overlapping opposite ends of said grooves, vanes on said member projecting radially into said grooves to divide the same into two chambers, means interconnecting the chambers of each pair for the restricted flow of fluid therebetween, and means yieldably coupling said drive member and ball head for rotation in unison and for relative angular displacement about the rotational axis.

2. The combination of, a rotatable head having laterally spaced projections upstanding therefrom and having external arcuate surfaces concentric with the ball head axis, said projections having outwardly opening grooves extending longitudinally thereof, means disposed between said projections for sensing changes in the speed of said head, a rotary driving member having a cylindrical wall closely surrounding said head surfaces and closing the outer edges of said grooves, said member having inturned annular portions overlapping opposite ends of said grooves, vanes on said member projecting radially into said grooves to divide the same into two chambers, means interconnecting the chambers of each pair for the restricted flow of fluid therebetween, and means yieldably coupling said drive member and head for rotation in unison and for relative angular displacement about the rotational axis.

3. A speed sensing device having, in combination, a rotary driving disk having a radially disposed vane upstanding therefrom, a cylinder concentric with and upstanding from said disk and surrounding said vane, a rotatable ball head axially spaced from said disk and having an outwardly opening groove receiving said vane and cooperating with the vane and said cylinder to define fluid chambers interconnected by a flow restricting passage and variable in volume in response to relative angular displacement between said disk and head, an angularly yieldable resilient coupling connecting said disk and ball head for driving the latter, a flyweight mounted on said ball head and angularly spaced from said chambers, and control means responsive to changes in the radial position of said flyweight.

4. A speed responsive device, having in combination, a drive shaft, a rotary ball head alined axially therewith, a coupling between said ball head and said shaft resiliently yieldable angularly, a flyweight upstanding from and pivoted on said ball head to move radially in a diametrical plane in response to speed changes, a cup carried by said drive shaft and surrounding said ball head and flyweights, said cup being adapted to contain a body of liquid, radially disposed walls respectively mounted on said ball head and cup and angularly spaced from said flyweight, said walls interfitting with each other to form a pair of dashpot chambers immersed in said liquid, and an internal surface on said cup and an opposed external surface on said ball head coacting to form a restricted passage between said chambers.

5. A speed responsive device having, in combination, a rotary ball head, angularly spaced flyweights mounted thereon for radial displacement in response to changes in the ball head speed, a driving member rotatable about the ball head axis and adapted to contain a body of liquid immersing the ball head, two dashpots angularly spaced from each other and from said flyweights and lying alongside the flyweights for rotation with the latter in a common plane, each of said dashpots being immersed in said liquid body and having a restriction through which the liquid is displaced in response to relative angular movement between said ball head and said drive member, and an angularly yieldable coupling connecting said head and drive member.

6. A speed responsive device having, in combination, a rotary driving part, a ball head journaled on said part to turn relative thereto about the axis thereof, means yieldably coupling said ball head and said part for normal rotation in unison but permitting relative angular displacement between the two in response to sudden changes in the speed of said part, a flyweight mounted on said ball head to swing in a plane transversely thereof in response to speed changes, members rigid with said ball head and said part disposed alongside said flyweight and angularly spaced therefrom, means enclosing said part, said ball head, and said members and adapted to contain a body of liquid submerging said members, radially disposed walls on said members interfitting with each other to define two dashpot chambers disposed alongside said flyweight in the plane of rotation thereof, and non-radial surfaces formed on the respective ones of said members and coacting with each other to form flow restricting passages between said chambers and between said external fluid body and at least one of said chambers whereby said chambers are maintained filled with said fluid by gravity flow from the surrounding fluid body while limiting the rate of fluid flow out of one chamber and into the other during relative angular displacement of said part and ball head.

7. A speed responsive device having, in combination, a rotary driving member, a ballhead member axially alined with said driving member, means yieldably connecting said members for normal rotation in unison but permitting relative angular displacement between the two in response to sudden changes in speed of said driving member, a flyweight mounted on said ballhead member, means including a wall rigid with one of said members and defining an arcuate dashpot chamber concentric with the rotational axis of said ballhead and adapted to contain a body of liquid, a solid vane rigid with the other of said members and disposed in said chamber to divide the chamber into two parts, and an external surface on said vane opposing but spaced from said wall and coacting with the wall to form a flow restricting passage between the parts of said chamber and thereby limit the rate of flow out of a part and into the other during relative angular displacement of said members.

8. A speed responsive device comprising, a rotary driving member, a rotatable ballhead member alined with said driving member and carrying a flyweight movable toward and away from the rotational axis of said ballhead, an angularly yieldable drive coupling between said members, a container for a liquid rigidly mounted on one of said members for rotation therewith and having an arcuate internal wall concentric with said axis, an opposed arcuate wall on the other of said members concentric with said axis and said container wall and cooperating with the latter to define an arcuate dashpot chamber, a vane rigid with one of said members and disposed in said chamber to divide the chamber into two parts filled with said liquid, said vane having an external surface opposing but spaced from one of said walls and coacting therewith to form a restricted passage between the parts of said chamber and thereby to limit the rate of flow of said liquid from one part to the other during relative angular displacement of said members.

9. A speed responsive device having, in combination, a ballhead member rotatable about a predetermined axis and carrying a flyweight movable relative thereto, a driving member rotatable about said axis, an angularly yieldable coupling between said members permitting relative angular displacement between the two in response to sudden changes in speed of said driving member, a surface rigid with one of said members, means including said surface and defining an arcuate dashpot chamber concentric with said axis and adapted to contain a body of liquid, a vane rigidly joined at one end to the other of said members and projecting into said chamber in a direction parallel to said axis thereby to divide the chamber into two parts, and a surface on said vane opposing but spaced from said first surface and cooperating with the same to form a flow restricting passage between the two parts of said chamber.

GEORGE E. PARKER.

References Cited in the file of this patent
UNITED STATES PATENTS

| Number | Name | Date |
|---|---|---|
| 986,498 | Raders | Mar. 14, 1911 |
| 1,087,818 | Osborne | Feb. 17, 1914 |
| 2,307,506 | Huntington | Jan. 15, 1943 |